United States Patent
Schloffer

(10) Patent No.: US 11,542,582 B2
(45) Date of Patent: Jan. 3, 2023

(54) METHOD FOR PRODUCING A COMPONENT OF GAMMA—TIAL AND COMPONENT PRODUCED THEREFROM

(71) Applicant: MTU Aero Engines AG, Munich (DE)

(72) Inventor: Martin Schloffer, Munich (DE)

(73) Assignee: MTU Aero Engines AG, Munich (DE)

( * ) Notice: Subject to any disclaimer, the term of this patent is extended or adjusted under 35 U.S.C. 154(b) by 614 days.

(21) Appl. No.: 16/437,444

(22) Filed: Jun. 11, 2019

(65) Prior Publication Data
US 2019/0376170 A1 Dec. 12, 2019

(30) Foreign Application Priority Data
Jun. 12, 2018 (DE) .................... 10 2018 209 315.6

(51) Int. Cl.
*C22F 1/18* (2006.01)
*B33Y 10/00* (2015.01)
*B33Y 70/00* (2020.01)
*B33Y 80/00* (2015.01)
*B23K 15/00* (2006.01)
(Continued)

(52) U.S. Cl.
CPC .......... *C22F 1/183* (2013.01); *B23K 15/0086* (2013.01); *B30B 15/34* (2013.01); *B33Y 10/00* (2014.12); *B33Y 70/00* (2014.12); *B33Y 80/00* (2014.12); *C22C 14/00* (2013.01)

(58) Field of Classification Search
CPC ......... C22F 1/183; B33Y 10/00; B33Y 70/00; B33Y 80/00; B23K 15/0086; B30B 15/34; C22C 14/00
See application file for complete search history.

(56) References Cited

U.S. PATENT DOCUMENTS 5,299,353 A * 4/1994 Nazmy ..................... F01D 5/28
29/889.7
5,328,530 A 7/1994 Semiatin et al.
(Continued)

FOREIGN PATENT DOCUMENTS

AT 509768 B1 4/2012
DE 102015103422 B3 7/2016
(Continued)

OTHER PUBLICATIONS

Chen et al ("Brittle-ductile transition during creep in nearly and fully lamellar high-Nb TiAl alloys", Intermetallics, vol. 93, Feb. 2018, pp. 47-54) (Year: 2018).*
(Continued)

*Primary Examiner* — Nicole M. Buie-Hatcher
*Assistant Examiner* — Jiangtian Xu
(74) *Attorney, Agent, or Firm* — Barlow, Josephs & Holmes, Ltd.

(57) ABSTRACT

The present invention relates to a method for producing a component of a γ-TiAl alloy, in which, in a first step, a forging blank made of a γ-TiAl alloy is built up from a powder material by an additive method, and subsequently, in a second step, the forging blank is reshaped into a semi-finished product, wherein the degree of reshaping over the entire forging blank is high enough that, in a third step, the structure is recrystallized during a heat treatment. In addition, the invention relates to a component produced therefrom.

15 Claims, 1 Drawing Sheet

1

(51) Int. Cl.
   *B30B 15/34*    (2006.01)
   *C22C 14/00*    (2006.01)

(56) References Cited

U.S. PATENT DOCUMENTS

| | | | | |
|---|---|---|---|---|
| 5,442,847 A * | 8/1995 | Semiatin | .................. | C22F 1/183 |
| | | | | 148/670 |
| 2004/0045644 A1* | 3/2004 | Guther | .................... | C22C 14/00 |
| | | | | 148/538 |
| 2016/0023307 A1* | 1/2016 | Suciu | ..................... | B33Y 10/00 |
| | | | | 219/121.64 |
| 2016/0354976 A1* | 12/2016 | Zhang | ..................... | B22F 10/64 |
| 2017/0335436 A1* | 11/2017 | Schloffer | .................. | B22F 3/15 |
| 2018/0304531 A1* | 10/2018 | Gallant | ................. | B29C 64/314 |

FOREIGN PATENT DOCUMENTS

| | | | |
|---|---|---|---|
| EP | 3372700 A1 | 9/2018 | |
| WO | 2019040509 A1 | 2/2019 | |

OTHER PUBLICATIONS

CompositesWorld ("Wind turbine blades: Big and getting bigger", 2008) (Year: 2008).*

Chen, Xueyang et al: "Design and Fabrication of Functionally Graded Material from Ti to Design and Fabrication of Functionally Graded Material from Ti to [gamma]-TiAl by Laser Metal Deposition—TiAl by Laser Metal Deposition Design and Fabrication of Functionally Graded Material from T", Aug. 9, 2017 (Aug. 9, 2017), pp. 148-159.

* cited by examiner

METHOD FOR PRODUCING A COMPONENT OF GAMMA—TIAL AND COMPONENT PRODUCED THEREFROM

BACKGROUND OF THE INVENTION

Field of the Invention

The present invention relates to a method for producing a component of a TiAl alloy and, in particular of a γ-TiAl alloy, as well as a corresponding component of a turbomachine, in particular a blade or a blade segment of an aircraft engine or a stationary gas turbine.

Prior Art

Based on their strength due to the formation of intermetallic phases such as γ-TiAl and $\alpha_2$-$Ti_3$Al, as well as because of their low specific weight, titanium aluminides and corresponding alloys that comprise titanium and aluminum as the main alloy components are of interest for a multitude of applications in which high strength and low weight play a role, such as, for example, for moving components in turbomachines such as aircraft engines or stationary gas turbines. Titanium aluminide alloys in this case are employed particularly as γ-TiAl alloys that are in large part composed of γ-TiAl phase. The γ-TiAl alloys here can have structures that range from a pure γ-TiAl structure with preferably equiaxial γ-TiAl grains, through duplex structures having γ-TiAl grains and lamellar grains, up to completely lamellar structures with lamellar grains of alternating γ-TiAl and $\alpha_2$-$Ti_3$Al laminae. Modern TiAl alloys comprise niobium and molybdenum, among others, as alloy components and are thus also referred to as TNM-TiAl.

Of course, it is a disadvantage that corresponding components made of TiAl alloys have a small notch impact strength, since the components frequently shall be employed at higher temperatures, thus at temperatures above the half melting point, and therefore must have a sufficient creep stability. Microstructures that have this property, however, usually possess a low ductility.

Moreover, components made of TNM-TiAl with large dimensions, having an extent of more than 50 cm in their largest dimension, are also difficult to produce, since these parts can be manufactured free of segregations only with difficulty by metallurgical melting, which can lead to inadmissible fluctuations in the local microstructure and in local mechanical properties. In particular, so-called macrosegregations in the dimensional range of greater than 200 μm also cannot be eliminated by forging the corresponding component, since a recrystallization of the structure after forging only leads to an elimination of microsegregations in the dimensional range of less than 200 μm.

It is already also known from the prior art to build up components made of TiAl alloys from powder, layer by layer, by additive manufacturing methods. For example, appropriate powder material can be melted and combined into corresponding components by electron beam melting or selective laser melting. Of course, the problem here consists of the fact that components manufactured in such a way frequently may have undesired textures, which lead to an anisotropy of the mechanical properties, as well as microsegregations with dimensions in the range of layer thicknesses of approximately 100 μm.

SUMMARY OF THE INVENTION

Object of the Invention

It is therefore the object of the present invention to provide a method for producing a component made of a TiAl alloy as well as a corresponding component, in which the disadvantages of the prior art are avoided. In particular, components that are free of segregations and textures shall be produced in a simple and efficient manner, particularly also fulfilling the different requirements with respect to ductility, strength, creep resistance, and notch impact strength.

Technical Solution

This object is achieved by a method as well as a component of the present invention. Advantageous embodiments are discussed in detail below.

The present invention proposes a method for producing a component made of a TiAl alloy, and in particular, a γ-TiAl alloy, in which a forging blank made of the corresponding TiAl alloy is first built up from powder material by an additive method. Subsequently, this additively produced forging blank is reshaped into a semi-finished product in a second step, wherein, the degree of reshaping over the entire forging blank is high enough so that with a heat treatment in a third step, the structure is recrystallized. Due to the additive manufacture, segregations, and macrosegregations in particular, which can no longer be eliminated by a subsequent forging, can be prevented. Microsegregations or textures that have been introduced by the additive manufacture of the forging blank can be eliminated again in a simple way by the second reshaping step. Furthermore, the additive manufacture of the forging blank makes possible the establishing of different structures or microstructures in different regions of a component formed in one piece, since different chemical compositions of the component material can be established in various regions of the forging blank in the additive manufacture.

In general, the invention can be employed in components made of titanium aluminides and titanium aluminum alloys that are referred to as TiAl alloys in the scope of the present invention. These alloys include all alloys whose main components are titanium and aluminum, and correspondingly, can form intermetallic phases with both of these components, namely titanium and aluminum. In particular, the TiAl alloys may also comprise other alloy components such as niobium and/or molybdenum and/or tungsten.

In the method according to the invention, the third step of recrystallization can take place simultaneously with the second step in the form of a dynamic recrystallization during a heat reshaping, and/or the third step of recrystallization can take place chronologically after the second step of reshaping by conducting a separate heat treatment. The heat treatment for carrying out a recrystallization of the structure may also be combined with a compressing of the semi-finished product by hot isostatic pressing (HIP). Pores that have been introduced into the semi-finished product by additive manufacture in the production of the forging blank can be eliminated by the hot isostatic pressing.

The additive manufacture of the forging blank can take place via different methods, wherein electron beam melting (EBM) is offered, in particular. However, methods such as selective laser melting (SLM) may also be employed.

The reshaping of the forging blank into the semi-finished product can take place in one step, so that complicated multi-step forging processes can be avoided. In particular, the reshaping can be carried out with at least a high enough degree of reshaping that a complete recrystallization of the reshaped semi-finished product is made possible. Correspondingly, the forging blank can be formed with an already complex geometry or one that is close to the final contour, wherein the energy necessary for the recrystallization can be introduced at all positions in the forging blank in one reshaping process.

The establishing of different chemical compositions and different microstructures resulting therefrom in various regions of the forging blank, for example, with respect to establishing a different aluminum content, can be achieved by a variably intense treatment of the powder with an energy-rich beam, such as an electron beam for example, during the additive manufacture. Thus, the temperature of the melt and/or the duration of the molten state can be varied, so that aluminum can vaporize to a differing degree. In this way, the aluminum content can be varied in a simple way during the additive manufacture, and it is possible to establish different regions over the component that have different chemical compositions as well as graded regions having a gradient in the chemical composition. In this way, it is possible to produce a component that has a different, appropriately adapted structure in the various regions in which there are different requirements with respect to ductility, strength, creep resistance, impact strength, etc.

According to the third step of the recrystallization, the semi-finished product can be cooled from the recrystallization temperature in a suitable way; in particular, it can be rapidly cooled or quenched. In the lamellar regions of the structure, the width of the lamellae that is to be established can be influenced by the quenching rate.

The semi-finished product that is present after the reshaping of the forging blank and the recrystallization heat treatment may already substantially correspond to the final form of the component. Only a small amount of post-processing may be necessary in the surface region. This may be carried out mechanically, chemically, and/or electrochemically.

A corresponding component is free of textures and segregations and can be produced with dimensions for which the largest dimension can be greater than 0.5 m.

The component may have regions with different chemical compositions or regions with continuously varying chemical composition and correspondingly possess different structures or a graded structure.

In particular, the component can be a blade or a blade segment having a plurality of blades for a turbomachine, such as an aircraft engine or a stationary gas turbine, wherein such a blade can be formed at its blade root and/or at blade edges with a higher ductility and correspondingly, a higher proportion of γ-TiAl grains than in other regions, and may also have correspondingly a higher aluminum concentration in these regions.

BRIEF DESCRIPTION OF THE DRAWING FIGURES

In a purely schematic manner, in the appended drawings.

DESCRIPTION OF THE INVENTION

Figure 1:
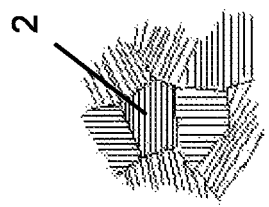
FIG. 1 shows a γ-TiAl structure.

Further advantages, characteristics, and features of the present invention will become apparent in the following detailed description of the embodiment examples. Of course, the invention is not limited to these embodiment examples.

In particular, the present invention can be utilized for producing components of turbomachines, such as stationary gas turbines or aircraft engines. For example, it is possible to produce blades, and in particular rotating blades, as well as blade segments having a plurality of blades, by the method according to the invention. For this purpose, first a forging blank is constructed from powder material by an additive method, such as, for example, selective laser melting or electron beam melting. As powder, γ-TiAl powder is used, which is formed, for example, by an alloy with a chemical composition containing 43.5 at. % aluminum, 4 at. % niobium, and 1 at. % Mo, with the remainder of titanium.

The forging blank produced by the additive method has a form that is already close to the final form of the component to be produced, such as, for example, the blade or the blade segment. Of course, the form is selected such that in a subsequent reshaping step, the degree of reshaping over the entire forging blank is high enough that a recrystallization of the structure can occur.

Correspondingly, after its additive manufacture, by means of drop forging in one single reshaping step, the forging blank is brought to a form that represents a semi-finished product of the component to be produced, which already to a great extent has the final contour of the component and only requires a surface processing or a slight adjustment in form for the final shaping of the component.

After the production of the semi-finished product by reshaping, the thus-produced semi-finished product is subjected to a heat treatment, so that a recrystallization of the structure takes place. Due to the recrystallization, microsegregations that may arise during the additive manufacture, for example, due to the layer-by-layer formation of the forging blank, are completely eliminated, and the structure will be homogenized. The heat treatment can take place in the scope of a hot isostatic pressing (HIP) process, by means of which a compressing of the component can be achieved simultaneously, so that pores that may arise during the additive manufacture can be eliminated. It is also possible, of course, that a dynamic recrystallization already occurs in the reshaping of the forging blank into the semi-finished product during the hot reshaping.

For establishing the desired structure, after the reshaping and/or the recrystallization heat treatment or the hot isostatic pressing, the semi-finished product is cooled in a suitable way, so that a desired structure is established. In particular, the establishing of the lamellar spacings in the lamellar regions of the structure can be influenced by a rapid cooling.

Due to the production method employed, it is possible in a simple way to establish different structures in different regions of the component to be produced, so that the component can have different mechanical properties in different regions, even though it is formed in one piece. Therefore, the different requirements for the component can be fulfilled, in particular for blades or blade segments of turbomachines, by establishing different structures in different regions.

Figure 2:
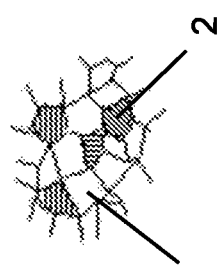
FIG. 2 shows a duplex structure made of γ-TiAl grains and lamellar grains with alternating laminae of γ-TiAl and $\alpha_2$-$Ti_3Al$.
Figure 3:
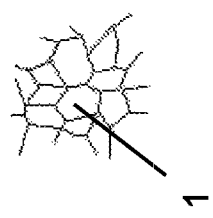
FIG. 3 shows a completely lamellar structure.

For example, in the production of blades or blade segments, regions in the blade root and at the edges of the blade, which should have a ductility that is as high as possible and a good resistance to fatigue loading, are formed with high aluminum content, so that γ-TiAl structures are established for the most part, as this is shown, for example, in FIG. 1, in which γ-TiAl grains 1 are present exclusively in the structure shown. In contrast, in the blade body, where high creep resistances may be necessary, a fully lamellar-formed structure can be established, as is shown in FIG. 3. FIG. 2 shows a duplex structure with lamellar grains 2 and γ-TiAl grains 1.

Establishing the different structure can be accomplished by varying the aluminum content. The aluminum content can be established during the additive manufacture by vaporizing (burning off) aluminum with varying intensity. During the additive manufacture, if the melt of the powder is brought to a higher temperature and/or kept for a longer time at a higher temperature, then more aluminum can be vaporized and the aluminum content can be varied over the forging blank despite the use of one and the same powder. Correspondingly, the formation of a graded microstructure is also possible by establishing a gradient of aluminum content over the component.

Figure 4:
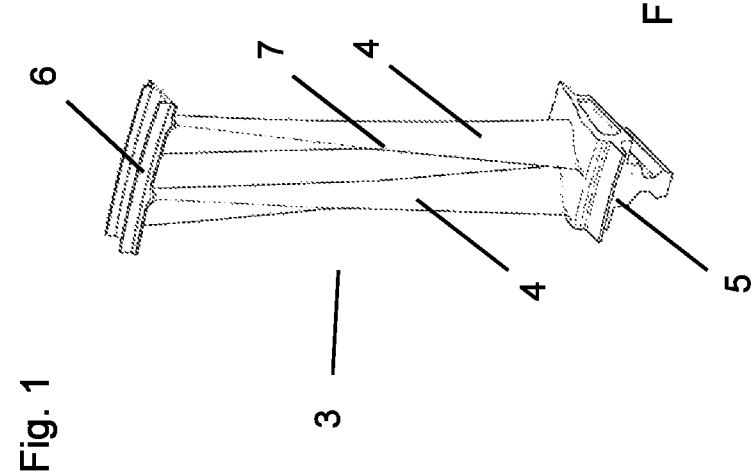
FIG. 4 shows a perspective representation of a rotating blade segment having two rotating blades.

In a perspective representation, FIG. 4 shows an example of a rotating blade segment 3 with two blades 4, which are arranged on an inner shroud with a common root 5. The ends of the blades 4 lying opposite to the root 5 are joined via an outer shroud 6. In such a component, aluminum-rich regions can be formed in the region of the root 5 and in the region of the outer shroud, as well as at the blade edges 7, so that structures with a high proportion of γ-TiAl can be established, whereas in the region of the blade element, a completely lamellar structure can be established by a lower aluminum content. For example, if there is a fracture of a blade element due to an impact of a foreign body in the region of the blade element that has a high creep resistance but a low ductility based on the completely lamellar structure, then, via the inner and outer shrouds 6, which have a higher ductility, the fractured parts of the blade 4 additionally join to the blade segment 3, so that possibly a total failure can be avoided.

Although the present invention has been described in detail on the basis of the embodiment examples, it is obvious to the person skilled in the art that the invention is not limited to these embodiment examples, but rather that modifications are possible in a way such that individual features are omitted or other kinds of combinations of features can be made without departing from the protective scope of the appended claims. In particular, the present disclosure includes in it all combinations of the individual features shown in the different embodiment examples, so that individual features that are described only in conjunction with one embodiment example can also be utilized in other embodiment examples, or combinations of individual features that are not explicitly shown can also be utilized.

What is claimed is:

1. A method for producing a component of a γ-TiAl alloy, wherein a forging blank made of the γ-TiAl alloy is built up from powder material in a first step by an additive method, and subsequently the forging blank is reshaped into a semi-finished product in a second step,
wherein, in a third step, the forging blank is subjected to heat treatment wherein recrystallization occurs during the heat treatment.

2. The method according to claim 1, wherein the third step of recrystallization occurs simultaneously with the second step, in a form of dynamic recrystallization during a heat reshaping, and/or the third step of recrystallization takes place after the second step of reshaping during a compression by hot isostatic pressing of the semi-finished product, combined with the heat treatment.

3. The method according to claim 1, wherein the additive manufacture takes place by electron beam melting.

4. The method according to claim 1, wherein the reshaping takes place in one step.

5. The method according to claim 1, wherein a form of the additively manufactured forging blank is selected wherein a substantially complete recrystallization of the reshaped semi-finished product occurs.

6. The method according to claim 1, wherein during the additive manufacture, the forging blank is produced with at least two regions of different chemical composition with a continually varying chemical composition over one region of the forging blank.

7. The method according to claim 1, wherein a different chemical composition is produced in the forging blank during the additive manufacture by burning off aluminum at different intensity during a melting of the powder.

8. The method according to claim 1, wherein after the third step of recrystallization, the semi-finished product is quenched from a recrystallization temperature.

9. The method according to claim 1, wherein the semi-finished product is post-processed mechanically, chemically, and/or electrochemically.

10. The method according to claim 1, wherein a blade or a blade segment having a plurality of blades is produced in one piece as the component.

11. The method according to claim 10, wherein regions in the blade root and/or at the blade edges are formed with a higher Al concentration than remaining blade regions.

12. The method according to claim 10, wherein, in a region of the blade root and/or of blade edges, a structure with a higher proportion of γ-TiAl grains is present than in remaining blade regions, wherein a structure having a completely lamellar structure is present in blade regions with higher creep loads than in other regions.

13. The method according to claim 1, wherein the component is formed as a blade or a blade segment of an aircraft engine or a gas turbine, wherein the component is produced from a γ-TiAl alloy, wherein the component does not have undesired textures and segregations.

14. The method according to claim 13, wherein the component has a length of at least 0.3 m.

15. The method according to claim 13, wherein the component has pre-defined regions with different or continuously varying chemical composition and/or pre-defined regions with completely lamellar structure.

* * * * *